United States Patent [19]

Nickel

[11] Patent Number: 4,891,038

[45] Date of Patent: Jan. 2, 1990

[54] DRIVE AND BEARING ARRANGEMENT FOR TWO OPPOSITELY ROTATING, ADJACENTLY LOCATED ROTOR SYSTEMS

[75] Inventor: Klaus-Dietrich Nickel, Frankfurt am Main, Fed. Rep. of Germany

[73] Assignee: Kasa-Technoplan GmbH, Frankfurt am Main, Fed. Rep. of Germany

[21] Appl. No.: 220,482

[22] Filed: Dec. 14, 1987

[30] Foreign Application Priority Data

Dec. 24, 1986 [DE] Fed. Rep. of Germany ....... 3644448

[51] Int. Cl.⁴ ............................................. F16H 55/32
[52] U.S. Cl. .................................................. 474/166
[58] Field of Search .............................. 474/166–169, 474/184–187, 902, 903; 384/129, 126, 416, 417, 418

[56] References Cited

FOREIGN PATENT DOCUMENTS 0114872 10/1876 France ................................. 474/166
0622053 10/1920 France ................................. 474/166

Primary Examiner—Thuy M. Bui
Attorney, Agent, or Firm—Toren, McGeady & Associates

[57] ABSTRACT

A drive and bearing arrangement for two rotor systems of a disintegrator which rotate in opposite directions and are mounted next to each other. Each rotor system has a rotor support member and a drive hub. The rotor support member of each rotor system is rotatably mounted through a rotor bearing directly on a common vibration absorbing and elastically mounted support and supply tube. The other end of each hub is rotatably mounted through a drive bearing on an axially movable shaft stub mounted in a bearing block.

26 Claims, 1 Drawing Sheet

U.S. Patent    Jan. 2, 1990    4,891,038
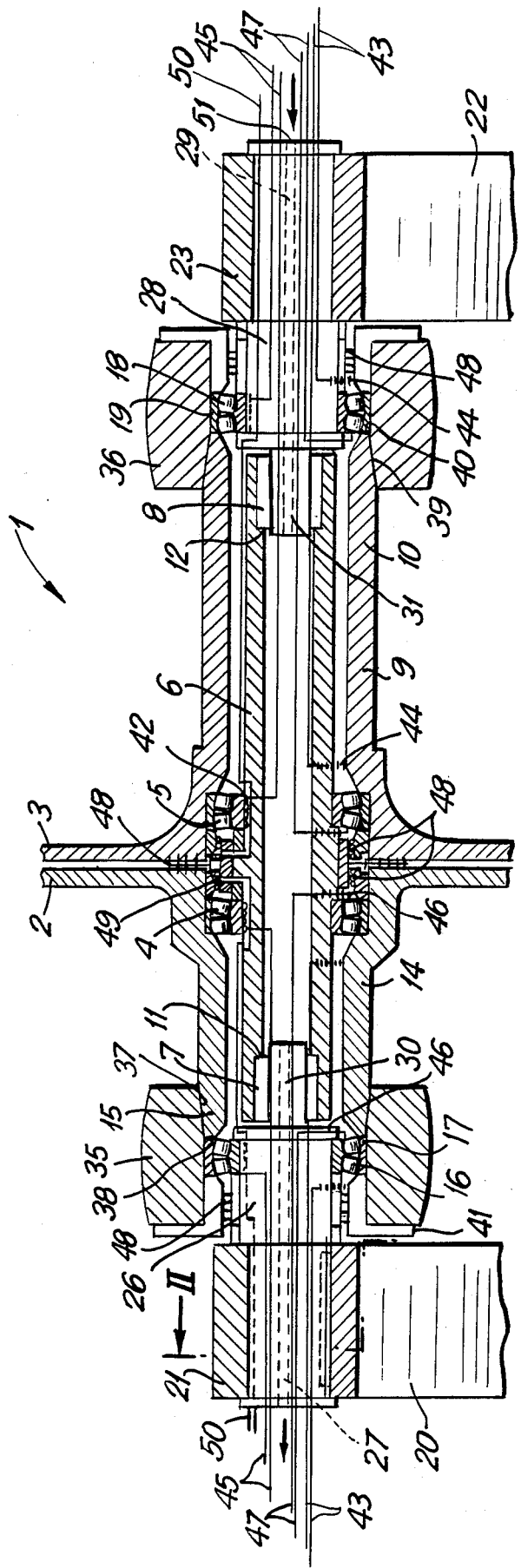
FIG. I
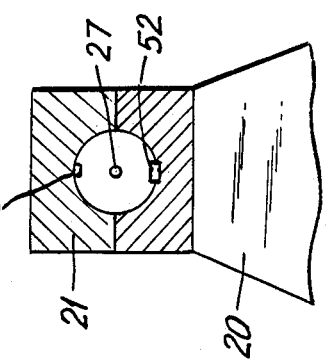
FIG. 2

DRIVE AND BEARING ARRANGEMENT FOR TWO OPPOSITELY ROTATING, ADJACENTLY LOCATED ROTOR SYSTEMS

BACKGROUND OF THE INVENTION

1. Field of the Invention

The present invention relates to a drive and bearing arrangement for the rotor systems of a disintegrator or the like which rotor systems rotate in opposite directions and are arranged next to each other.

1. Description of the Prior Art

Disintegrators are used for comminuting different types of materials.

Most disintegrators have rotor systems with blade rings which rotate in opposite directions within a housing. The material to be comminuted is fed into the housing in the vicinity of the inner portions of the rotor systems and, due to the centrifugal force, is moved outwardly where it is comminuted. The comminuted material is subsequently removed from the outer housing portion.

Disintegrators of this type in principal operate in the same manner as the arrangement for the comminution of coal disclosed in French Pat. No. 677,966. The rotor systems are fastened to oppositely located ends of shaft stubs which are mounted in the housing as well as outside of the housing. The shape of the rotor blades depends upon the type of material to be comminuted and on the rate of rotation to be employed in the disintegrator.

In the operation of conventional disintegrators, vibrations are generated which are virtually impossible to control. These vibrations not only reduce the service life of the disintegrators, but they also are the cause for the emission of intensive noise. Even if the rotor systems and all rotating components are well balanced, vibrations are caused by the material to be comminuted which sticks in more or less substantial amounts to the blades. While, on the one hand, this effect is desirable because the wear of the blades is reduced, it leads, on the other hand, sooner or later to imbalances which are responsible for the vibrations and which were virtually impossible to compensate in the past.

Since the rotor systems, particularly in disintegrators with high rates of rotation, additionally act as gyros, the usually non-uniform coatings of the blades with the comminuted material and the load on the blades resulting from feeding in the material to be comminuted frequently results in so-called d'Alembert's forces which act on the rotating systems and predominantly affect the bearings. If these bearings are structural components of the disintegrator housing, the latter acts as a sounding board when noises are emitted.

It is, therefore, the primary object of the present invention to provide a drive and bearing arrangement for the rotor systems of disintegrators in which the vibrations are reduced to a minimum and the generation of noise is almost completely prevented.

SUMMARY OF THE INVENTION

In accordance with the present invention, in a drive and bearing arrangement of the type described above, each rotor system has a rotor support member and a drive hub connected to the rotor support member. The rotor support member of each rotor system is rotatably mounted through a rotor bearing directly on a common vibration absorbing and elastically mounted support and supply tube. The other end of each hub is rotatably mounted through a drive bearing on an axially movable shaft stub mounted in a bearing block.

The arrangement according to the present invention provides the advantage that the vibrations occuring in the rotating systems are compensated by the vibration absorbing, elastically mounted support and supply tube. In addition, the significant drive forces used in disintegrators, for example, the tensile forces of drive belts, can be absorbed by the shaft stubs and can be conducted through the bearing blocks into the foundation, so that the shaft stubs and the bearing blocks do not have to absorb vibrations. On the other hand, the vibrations are absorbed in accordance with the present invention by structural elements which do not have to conduct the loads resulting from drive belts.

The rotor bearings and the drive bearings are special anti-friction bearings which operate without problems especially at high rates of rotation of approximately 3000 rotations per minute.

The drive and bearing arrangement according to the present invention is not a structural component of the disintegrator housing, nor is it fixedly connected to the housing, so that this housing cannot act as a sounding board for any residual vibrations of the rotating systems which may not have been completely compensated.

In accordance with a preferred feature of the present invention, the vibrations absorbing, elastic mounting of the support and supply tube is effected by special hydrodynamic bearings at the ends of the tube, wherein the hydrodynamic bearings are in floating connection with the corresponding shaft stub. These bearings can operate with low tolerances, so that, depending upon the size and rate of rotation of the disintegrator, an optimum damping of the vibrations is achieved.

In accordance with an advantageous feature of the present invention, the rotor bearings and drive bearings are cooled by a flow of cooling agent which flows through the support and supply tube. Light oil may be used as the cooling agent. By using the cooling agent, the temperature of the bearings can be reduced to 100° to 120° C. The oil used for cooling may also be hydraulic oil. This oil serves additionally to dampen the vibrations. The flow of cooling agent within the drive and bearing arrangement can be regulated by making the outlet opening somewhat narrower than the inlet opening, so that the oil backs up slightly.

By using the drive and bearing arrangement according to the present invention, it is not only possible to substantially increase the service life of a disintegrator, but the generation of noise can also be reduced to about 45 decibel. This value has been measured approximately 10 meters away from a building in which the disintegrator with the drive and bearing arrangement according to the present invention is housed.

Due to the low noise level generated by a disintegrator with the drive and bearing arrangement according to the present arrangement, this disintegrator does not have to be provided with an expensive sound absorbing housing. The use of transfer chambers also becomes unnecessary.

If the drive hubs of the rotor systems are coupled directly to electric motors, the non-compensated residual vibrations are transmitted to the motor bearings. This can be avoided by using flat belts as drive belts.

The rotating systems are provided with temperature sensors and vibration sensors whose leads are placed in the support and supply tube. The leads may be connected to a computer.

The shaft stubs are mounted in bearings which are composed of two bearings shells, wherein the upper bearing snell can be removed relatively easily, so that the entire drive and bearing arrangement can be raised when it is to be replaced.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWINGS

In the drawing:

FIG. 1 is a sectional view in axial direction of the drive and bearing arrangement according to the present invention; and FIG. 2 is a transverse cross-section taken along sectional line II—II of FIG. 1.

DETAILED DESCRIPTION OF THE INVENTION

FIG. 1 is a partially schematic cross-sectional view in axial direction of the drive and bearing arrangement 1 according to the present invention.

Two rotor support members 2 and 3 are only partially illustrated. Rotor support members 2 and 3 rotate in opposite directions and are arranged next to each other. Rotor systems with any type of blades may be fastened to the rotor support members 2 and 3. These rotor systems including the rotor blades and the shape of the blades are not illustrated in the drawing because they are not part of the present invention.

Each rotor support member 2 and 3 is supported by means of a rotor bearing 4 and 5, respectively, directly on a support and supply tube 6 which shall be explained in more detail hereinbelow. Each rotor bearing 4 and 5 is maintained in the rotor support members 2 and 3 by means of a ring placed in a bearing bore. The ring and bearing bore are not designated in the drawing.

To each rotor support member 2 and 3 is connected a drive hub 9 and 14, respectively, the ends 10, 15 thereof being mounted by means of a drive bearing 16 and 17, respectively, on an axially movable shaft stub 26 and 28, respectively, in a bearing block 20 and 22, respectively.

In the illustrated embodiment, the rotor support members 2 and 3 and the drive hubs 9 and 14 are formed in one piece of, for example, cast steel. Rotor support member 2 and drive hub 14 and rotor support member 3 and drive hub 9 each form a unit. The drive hubs 9 and 14 are of unequal length. As illustrated in FIG. 1 of the drawing, the drive hub 9 shown on the righthand side is longer than the drive hub 14 on the lefthand side. The reason for this is that, in the disintegrator housing, not shown, the feed hopper for the material to be comminuted is arranged on the righthand side of the drive and bearing arrangement 1.

Each end 10, 15 of drive hubs 9, 14 is rigidly connected to a belt pulley 35, 36. The rotor systems are driven in opposite directions by means of electric motors which drive the belt pulleys 35, 36 through flat belts. In the illustrated embodiment, ends 10, 15 of drive hubs 9, 14 have conical shapes 39 and 37, respectively. The belt pulleys 35 and 36 are shaped so that they can be shrunk onto the conical ends of the drive hubs 9 and 14, respectively.

Without changing the scope of the invention, the belt pulleys 35 and 36 can also be connected in some other manner to the ends 10 and 15 of drive hubs 9 and 14. However, it has been found that by shrinking the belt pulleys 35 and 36 onto the ends, not only an excellent drive connection between the belt pulleys and the drive hubs can be obtained, but that as a result of this arrangement also a good removal of heat takes place from the belt pulleys 35, 36 which are frequently under great strain. This heat removal is increased by making the belt pulleys 35 and 36 of light cast metal, for example, cast aluminum, and providing them with fan surfaces 41.

The drive bearings 16 and 18 are arranged approximately in the middle of the belt pulleys 35 and 36, respectively. The outer races 17 and 19 of the drive bearings 16 and 18 rest against the annular end surfaces 38 and 40 of the conical ends 10 and 15 of the drive hubs 9 and 10. The rotor bearings 4 and 5 and the drive bearings 16 and 18 are special self-aligning bearings which operate safely even at high rates of rotation, for example, 3000 rotations per minute.

Drive bearings 16 and 18 are mounted on shaft stubs 26 and 28, respectively. shaft stubs 26 and 28 are provided with longitudinal bores 27 and 29. Shaft stubs 26 and 28 are supported axially movably in bearing blocks 20 and 22. This axial movement is to be permitted depending upon the diameter of the drive hubs 9 and 14 to such an extent as is required for compensating for the thermal expansion of the drive hubs 9 and 14.

FIGS. 1 and 2 of the drawing show that each bearing block 20, 22 has a removable upper bearing shell 21 and 23, respectively, which serve to mount the shaft stubs 26, 28. The upper bearing shells 21 and 23 can be removed by lifting in the conventional manner. After the bearing shells 21 and 23 have been lifted, the entire drive and bearing arrangement 1 can be easily removed from its mounting which facilitates exchange and service of the arrangement. Each shaft stub 26, 28 is secured against rotation relative to bearing block 20, 22 by means of a feather key 52.

The vibration damping, elastic mounting of the support and supply tube 6 is effected by means of a new type of hydrodynamic bearings 7 and 8, however, these bearings are not part of the present invention. These hydrodynamic bearing 7 and 8 are able to compensate all significant vibrations of the oppositely rotating rotor systems. The hydrodynamic bearings 7 and 8 are placed on bearing journals 30 and 31, respectively on the shaft stubs 26 and 28, respectively. The hydrodynamic bearings 7 and 8 are further received in bearing receiving bores 11 and 12, respectively in the ends of the support and supply tube 6. The longitudinal bores 27 and 29 extend further through the bearing journals 30 and 31, respectively, and are in alignment with the support and supply tube 6. The hydrodynamic bearings 7 and 8 permit a "floating" support of the rotor support members 2, 3.

As the sectional view of FIG. 1 clearly shows, the frequently substantial pull exerted by the belts on the belt pulleys 35 and 36 is conducted directly through shaft stubs 26 and 28 and bearing blocks 20 and 22 into the foundations, not shown, of the drive and bearing arrangement 1. Thus, the pull of the belts does not act on the rotating systems of the drive and bearing arrangement 1. The rotating systems are supported at the suitable location, i.e., in the immediate vicinity of the rotor support members 2 and 3, by means of self-adjusting bearings 4 and 5 so as to be rotatable on the support and supply tube 6 which is mounted in a vibration damping manner. Accordingly, the vibrations of the rotating systems are compensated through the support and supply tube 6 and the hydrodynamic bearings 7 and 8. In this manner, the vibrations are not transmitted to the bearing blocks 20 and 22 and certainly not to the disintegrator housing which is not connected to the drive and bearing arrangement 1.

As FIG. 1 also shows, temperature sensors 42 and vibration sensors 44 are arranged in the region of the rotor bearings 4 and 5 and the drive bearings 16 and 18. The leads 43 and 45 of the sensors extend through support and supply tube 6 and the longitudinal bores 27 and 29 of the shaft stubs 26 and 28 to the outside. The leads are connected to a computer which is not shown and does not form part of the present invention.

As FIG. 1 of the drawing further shows, the self-aligning bearings 4, 5 and 6, 18 are provided with lubricant mist nozzles 46. The supply lines 47 for the nozzles 46 also extend through the support and supply tube 6 and the shaft stubs 26 and 28.

Labyrinth seals 48 are arranged between the oppositely rotating rotor support members 2 and 3 and in front of the outer surfaces of the drive bearings 16 and 18. These seals 48 prevent comminuted material from entering the region between the drive hubs 9 and 14 and the support and supply tube 6 and they project the drive bearings. In this manner, all self-aligning bearings 4 and 5, 16 and 18 are protected against damaging influences. The labyrinth seals 48 are in communication with barrier gas nozzles 49 which are supplied through supply lines 50. The supply lines 50 can be placed either outside of or inside the support and supply tube 6. As FIGS. 1 and 2 show, the lines 50 also extend through shaft stubs 26 and 28 toward the outside. The slight excess pressure of the barrier gases within the space between the drive hubs 9 and 14 and the support and supply tube 6 also serves to discharge the oil mist generated by nozzles 46. In this manner, the oil mist also is utilized for cooling the drive and bearing arrangement 1.

A supply connection 51 for cooling liquid is shown on the righthand side of FIG. 1. The cooling liquid is conducted through bores 27 and 28 into the interior of the support and supply tube 6. Through connection 51, the drive and bearing arrangement 1 is connected to a closed cooling cycle including an oil cooler, not shown. For clarity's sake, the entire cooling cycle is not shown in FIG. 1. A hydraulic oil specially suited for this purpose may be used as a cooling liquid.

FIG. 2 of the drawing shows that, by means of a feather key 52, the shaft stubs 26 and 28 are axially movable but non-rotatable in the bearing blocks 20 and 22, respectively. Each bearing block 20, 22 has a removable bearing shell 21, 23. After the bearing shells 21, 23 have been removed, the entire drive and bearing arrangement 1 can be lifted out of bearing blocks 20 and 22 and can be replaces.

While a specific embodiment of the invention has been shown and described in detail to illustrate the application of the inventive principles, it will be understood that the invention may be embodied otherwise without departing from such principles.

I claim:

1. A drive and bearing arrangement for two rotor systems which rotate in opposite directions and mounted next to each other, wherein each rotor system has a rotor support member and a drive hub, each drive hub having first and second ends, the first end connected to the rotor support member, comprising a common vibration absorbing and elastically mounted support and supply tube, the support and supply tube having an axis, the rotor support member of each rotor system rotatably mounted through a rotor bearing directly on the support and supply tube, and the second end of each hub rotatably mounted through a drive bearing on an axially movable shaft stub mounted in a bearing block.

2. The drive and bearing arrangement according to claim 1, wherein the rotor bearings and the drive bearings are self-aligning bearings.

3. The drive and bearing arrangement according to claim 1, wherein the second end of each drive hub is rigidly connected to a belt pulley.

4. The drive and bearing arrangement according to claim 3, the second end of each drive hub having a conical shape, the belt pulley being shrunk onto the second end.

5. The drive and bearing arrangement according to claim 3, wherein each drive bearing is mounted approximately in the middle of the belt pulley.

6. The drive and bearing arrangement according to claim 5, wherein each drive bearing has an outer race and each drive hub has an annular end face, the outer race resting against the annular end face.

7. The drive and bearing arrangement according to claim 3, wherein each belt pulley is of light cast metal.

8. The drive and bearing arrangement according to claim 7, wherein each belt pulley is provided with fan surfaces.

9. The drive and bearing arrangement according to claim 1, wherein each shaft stub defines an axial bore, the axial bore being aligned with the support and supply tube, the ends of the support and supply tube being connected to the shaft stubs in a floating fashion by means of hydrodynamic bearings for the vibration absorbing elastic support of the tube.

10. The drive and bearing arrangement according to claim 9, wherein each hydrodynamic bearing is placed on a bearing journal on the shaft stub and in a bearing receiving bore in the support and supply tube.

11. The drive and bearing arrangement according to claim 1, wherein each rotor support member and the drive hub connected thereto form a structural unit.

12. The drive and bearing arrangement according to claim 1, wherein the drive hubs are of unequal length.

13. The drive and bearing arrangement according to claim 1, comprising temperature sensors for a computer control, the sensors mounted in the vicinity of the rotor bearings and drive bearings.

14. The drive and bearing arrangement according to claim 13, wherein a lead connected to the temperature sensor extends through at least one shaft stub and the support and supply tube.

15. The drive and bearing arrangement according to claim 1, comprising vibration sensors for a computer control, the sensors mounted in the vicinity of the rotor bearings and drive bearings.

16. The drive and bearing arrangement according to claim 15, wherein a lead connected to the vibration sensor extends through at least one shaft stub and the support and supply tube.

17. The drive and bearing arrangement according to claim 1, comprising lubricant mist nozzles adjacent the rotor bearings and the drive bearings.

18. The drive and bearing arrangement according to claim 17, wherein a supply line for the lubricant mist nozzles extends through at least one shaft stub and the support and supply tube.

19. The drive and bearing arrangement according to claim 1, wherein a labyrinth seal is provided between inner portions of the oppositely rotating rotor support members.

20. The drive and bearing arrangement according to claim 19, wherein the labyrinth seal is provided with a barrier gas nozzle supplied through a barrier gas line.

21. The drive and bearing arrangement according to claim 16, wherein the barrier gas line extends through at least one shaft stub and the support and supply tube.

22. The drive and bearing arrangement according to claim 1, wherein labyrinth seals are provided at outwardly facing sides of the drive bearings.

23. The drive and bearing arrangement according to claim 22, wherein each labyrinth seal is provided with a barrier gas nozzle supplied through a barrier gas line.

24. The drive and bearing arrangement according to claim 23, wherein the barrier gas line extends through at least one shaft stub and the support and supply tube.

25. The drive and bearing arrangement according to claim 1, wherein the shaft stubs define outwardly open openings capable of being connected to a cooling agent cycle.

26. The drive arrangement according to claim 1, wherein each bearing block includes a removable bearing shell for radial support of the shaft stubs, and wherein each shaft stub is secured against rotation relative to the bearing block by means of a feather key.

* * * * *